(12) United States Patent
Canal et al.

(10) Patent No.: US 6,476,948 B1
(45) Date of Patent: Nov. 5, 2002

(54) ACCURATE SYNCHRONIZING DEVICE

(75) Inventors: Yves Canal, Antony; Jean Chazelas, Paris; Daniel Dolfi, Orsay; Paul Sergent, Bur sur Yvette, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/308,652

(22) PCT Filed: Sep. 25, 1998

(86) PCT No.: PCT/FR98/02066
§ 371 (c)(1),
(2), (4) Date: Jun. 17, 1999

(87) PCT Pub. No.: WO99/17480
PCT Pub. Date: Apr. 8, 1999

(30) Foreign Application Priority Data

Sep. 30, 1997 (FR) .......................................... 97 12134

(51) Int. Cl.⁷ .............................................. H04B 10/00
(52) U.S. Cl. ........................ 359/158; 359/193; 359/140
(58) Field of Search ................................. 359/158, 110, 359/177, 166, 193, 140; 375/145, 149

(56) References Cited

U.S. PATENT DOCUMENTS

| | | | | |
|---|---|---|---|---|
| 3,699,344 A | * | 10/1972 | Rutz ........................... | 359/135 |
| 4,591,865 A | * | 5/1986 | Canal .................. | 343/700 MS |
| 5,070,790 A | * | 12/1991 | Le Parquier et al. ....... | 102/293 |
| 5,191,346 A | * | 3/1993 | Arignon et al. ............. | 342/128 |

(List continued on next page.)

OTHER PUBLICATIONS

Canal et al., U.S. patent application Ser. No. 06/736,310, filed Feb. 11, 1985.*
Canal, U.S. patent application Ser. No. 08/019,029, filed Feb. 18, 1993.*
Dolfi et al., U.S. patent application Ser. No. 08/722,226, filed Oct. 23, 1996.*
Le Halle et al., U.S. patent application Ser. No. 09/147,668, filed Feb. 16, 1999.*
d'Auria et al., U.S. patent application Ser. No. 09/218,153, filed Dec. 22, 1998.*

Primary Examiner—Leslie Pascal
Assistant Examiner—Christina Y Leung
(74) Attorney, Agent, or Firm—Oblon, Spivak, McClelland, Maier & Neustadt, P.C.

(57) ABSTRACT

A synchronization device which synchronizes signals transmitted from a transmitter to receivers. The transmitter includes a generator for generating a synchronization signal having a recurrence period substantially equal to the minimum resolution of the journey time between the transmitter and the receiver. Each receiver includes a controllable delay for delaying the synchronization signal and a synchronization loop downstream of the delay. The synchronization loop includes a semi-reflecting plate, a correlator and a device for slaving the delay depending on the correlation. A signal received by the receiver is synchronized when the correlation function of the two successive recurrences of the synchronization signal passing through the semi-reflecting plate is at a maximum. The device may be used for accurate synchronization of information distributed from a transmitter to mutually remote receivers, for example for operating complex electromagnetic or optical rigs.

21 Claims, 4 Drawing Sheets

U.S. PATENT DOCUMENTS

| | | | | |
|---|---|---|---|---|
| 5,235,463 A | * | 8/1993 | Broussoux et al. | 359/455 |
| 5,266,956 A | * | 11/1993 | Canal et al. | 342/128 |
| 5,285,305 A | * | 2/1994 | Cohen et al. | 359/110 |
| 5,298,740 A | * | 3/1994 | Ayral et al. | 250/227.11 |
| 5,305,401 A | * | 4/1994 | Becker et al. | 385/146 |
| 5,307,306 A | * | 4/1994 | Tournois et al. | 708/816 |
| 5,309,533 A | * | 5/1994 | Boniau et al. | 250/227.17 |
| 5,332,998 A | * | 7/1994 | Avignon et al. | 342/191 |
| 5,349,358 A | * | 9/1994 | Canal | 342/128 |
| 5,381,005 A | * | 1/1995 | Chazelas et al. | 250/227.19 |
| 5,424,747 A | * | 6/1995 | Chazelas et al. | 342/125 |
| 5,428,697 A | * | 6/1995 | Dolfi et al. | 250/226 |
| 5,430,454 A | * | 7/1995 | Refregier et al. | 342/36 |
| 5,446,470 A | * | 8/1995 | Avignon et al. | 343/712 |
| 5,453,865 A | * | 9/1995 | Faulkner et al. | 359/110 |
| 5,475,525 A | * | 12/1995 | Tournois et al. | 250/227.12 |
| 5,479,828 A | * | 1/1996 | Bonniau et al. | 156/166 |
| 5,487,484 A | * | 1/1996 | Bonniau et al. | 220/201 |
| 5,534,870 A | * | 7/1996 | Avignon et al. | 342/107 |
| 5,563,589 A | * | 10/1996 | Blaimont et al. | 340/10.34 |
| 5,629,699 A | * | 5/1997 | Chazelas et al. | 341/137 |
| 5,641,955 A | * | 6/1997 | Bonniau et al. | 250/227.14 |
| 5,672,008 A | * | 9/1997 | Bonniau et al. | 250/227.14 |
| 5,969,833 A | * | 10/1999 | Jensen | 359/110 |

* cited by examiner

ACCURATE SYNCHRONIZING DEVICE

BACKGROUND OF THE INVENTION

1. Field of the Invention

The present invention relates to an accurate synchronization device. It applies in particular to the making of accurate measurements or accurate, or even ultra-accurate synchronization of information distributed from a transmitter to mutually remote receivers, for example for operating complex electromagnetic and/or optical rigs.

2. Discussion of the Background

Temporal information being distributed to geographically scattered receivers, the term accuracy is understood to mean a dispersion in arrival time of the order of 10 picoseconds and the term ultra-accuracy to mean a dispersion in arrival time of the order of a picosecond. It is therefore necessary to ascertain the distances between the transmitter and the receivers with an accuracy of the order of a centimetre for the accurate class and a millimetre for the ultra-accurate class.

The present-day electronic systems for clock distribution generally have a passband of the order of a gigahertz, thus allowing them to achieve resolutions of the order of a nanosecond.

To achieve the class of accuracy of the order of a few tens of picoseconds, that is to say a factor 100 with respect to the aforesaid passband, these systems require calibration and compensation functions of a complexity such that the ultra-accurate class is not conceivable, the ultra-accurate class being that of a picosecond, i.e. a factor 1000. Examples of implementation of such systems are found for example in laser amplification rigs.

To calibrate these electronic systems, it is necessary to employ means for measurements having around ten times better accuracy, that is say of the order of a picosecond, and hence inaccessible.

Finally, to operate these systems with an accuracy of the order of some 10 picoseconds, it is necessary to employ an extremely stable and unperturbed electromagnetic and thermal environment, thus rendering their use intricate in the presence of high-energy pulse-like waves.

SUMMARY OF THE INVENTION

The purpose of the invention is to allow the distributing of temporal information to geographically scattered receivers with an extremely low time dispersion. To this end, the subject of the invention is a device for synchronizing signals transmitted from a transmitter to receivers, characterized in that it comprises at least, at the level of the transmitter, means for generating a synchronization signal having a recurrence period substantially equal to the minimum resolution of the journey time between the transmitter and a receiver and, at the level of each receiver, means for delaying the synchronization signal and a synchronization loop comprising, downstream of the delay means, a semi-reflecting plate such that a part of the signal makes at least one outward/return trip between the receiver and the transmitter, and comprising correlation means and means for slaving the delay means dependent on the correlation, a signal received by a receiver being synchronized when the correlation function of two successive recurrences of the synchronization signal passing through the semi-reflecting plate is a maximum.

The main advantages of the invention are, in particular, that it makes it possible to achieve ultra-accurate synchronization of signals, that it allows the distributing of temporal information to a large number of receivers situated at very different distances from the transmitter, these distances possibly being large, that it is rather insensitive to the electromagnetic and thermal disturbances of the environment and that it makes it possible intrinsically to monitor the proper working of the synchronization and to correct any drifting in respect of each receiver.

BRIEF DESCRIPTION OF THE DRAWINGS

Other characteristics and advantages of the invention will become apparent with the aid of the following description given in conjunction with the appended drawings which represent.

BRIEF DESCRIPTION OF THE PREFERRED EMBODIMENTS

Figure 1:
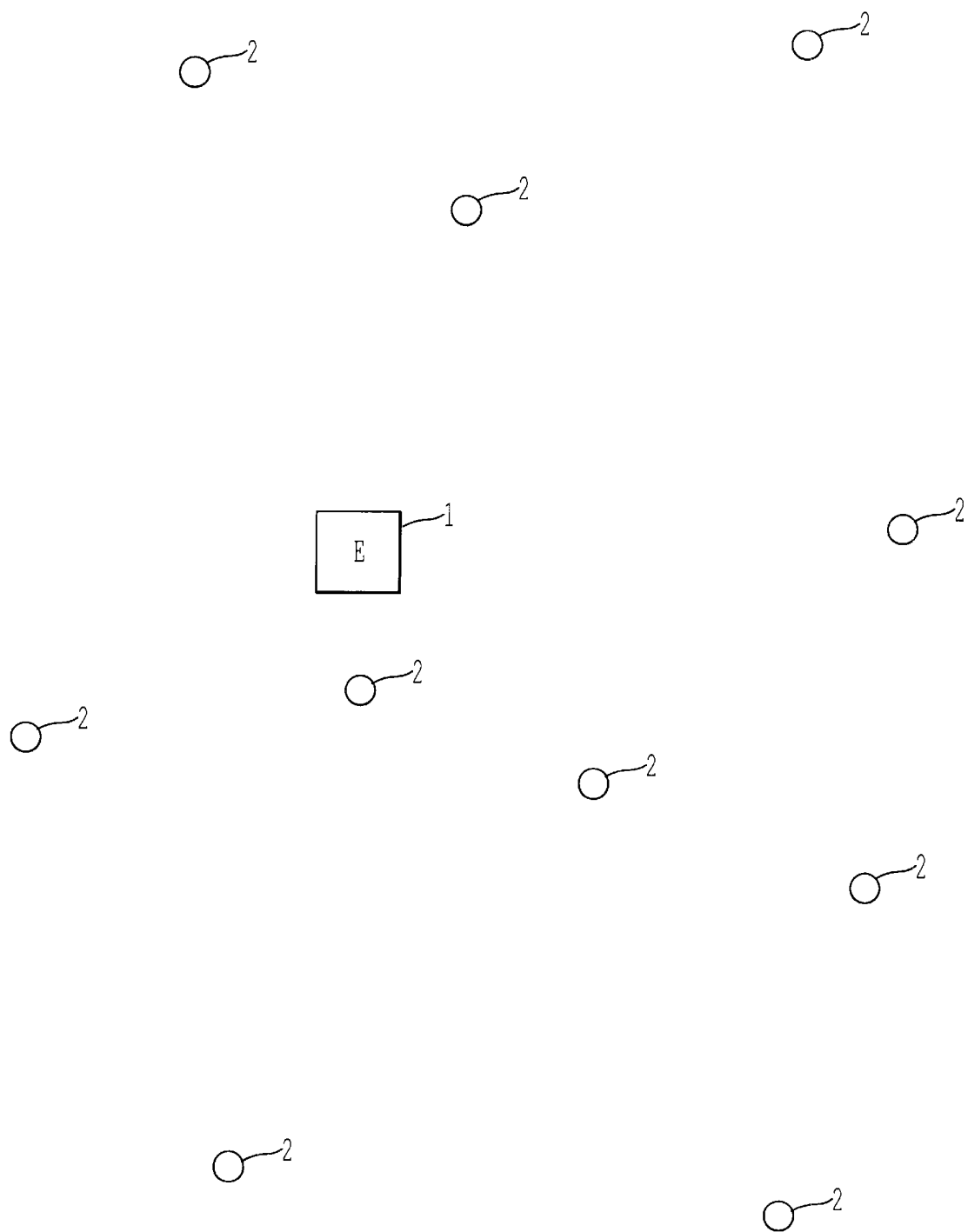
FIG. 1, an illustrative application of a device according to the invention.

FIG. 1 depicts an illustrative application of a device according to the invention. An electromagnetic or optical wave transmitter 1 transmits signals to geographically scattered receivers 2 which may be more or less remote from the transmitter, the values of the distances between the latter and the receivers possibly being in particular highly dispersed. In particular, the receivers 2 or synchronization points may be from a few tens to a few hundreds of metres distant from the transmitter. More generally, the invention applies in respect of all distances. It may for example concern a distributed antenna or a centralized transmitter for a laser amplification rig, with monitoring of delays. One objective of the invention is in particular to synchronize the signals picked up by the receivers to within a few picoseconds for example, that is to say in fact to monitor the duration of the journey of a signal from the transmitter to any one of the receivers to within a few picoseconds. To do this, the invention is based on an intrinsic measurement of the distances between the transmitter and the receivers, making it possible in particular to overcome the variations in the environment and drifting, and to adjust each transmitter/receiver leg so as to obtain a defined value of the journey time of the signal from the transmitter to the receiver, using, for example, optical or electromagnetic means.

The process according to the invention can be applied in particular by ascertaining, by construction or measurement, the length of the journeys between the transmitter and the receivers with an accuracy of for example only a few decimetres, this representing a weak constraint, then by tailoring the delay with respect to the estimated journey so as to obtain either synchronism or a very accurate value of the journey for each receiver. Stated otherwise, the process allows in particular a relative measurement of a very accurate length within an interval of ambiguity or uncertainty, approximate knowledge of the length being necessary.

The duration of the journey of a signal, for example optical, can be obtained through the sum of various parameters. For a receiver of order i, this duration can be obtained from the following three parameters:

the physical length Li of the journey between the transmitter and the receiver;

the correction ri of the journey time at the level of the receiver;

the initial delay Ri at the level of the transmitter.

The parameters ri and Ri can be tailored, the parameter Li is fixed. The total duration of the journey Rt is given by the following relation:

$$Rt = Li/nc + ri + Ri \quad (1)$$

where n and c are respectively the index of the propagation medium and the speed of light.

Knowing the length Li roughly, a more exact determination of the length of the journey, and hence of the time of propagation of a signal up to the receiver of order i can be defined. In a first step, the transmitter distributes the same signal, with a fixed recurrence frequency, to all or some of the receivers. Each receiver uses the information received to finely compensate the dispersions in the time of arrival of the signal. If necessary, a second step allows the measurement and locking onto a predefined value of the propagation time between the transmitter and each receiver on the basis of the result from the first step. The transmitter addresses itself to a receiver for which a locking of the delay is necessary. This receiver preserves its compensation and the transmitter sends a specific signal making it possible to ascertain this compensation and to modify it if necessary. This specific signal relies on the transmitting of a time-varying recurrence signal.

Figure 2:
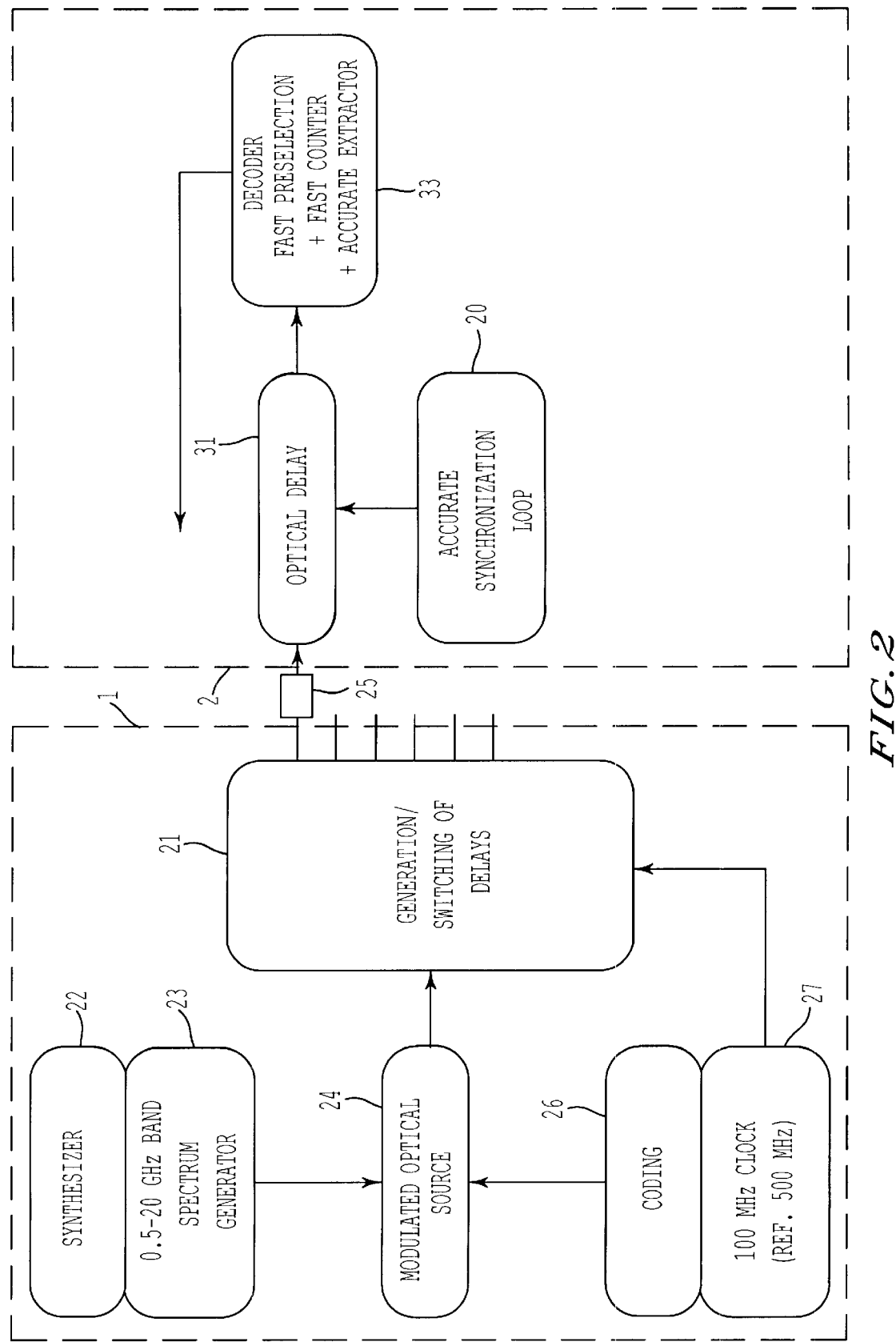
FIG. 2, one possible embodiment of a device according to the invention.
Figure 3:
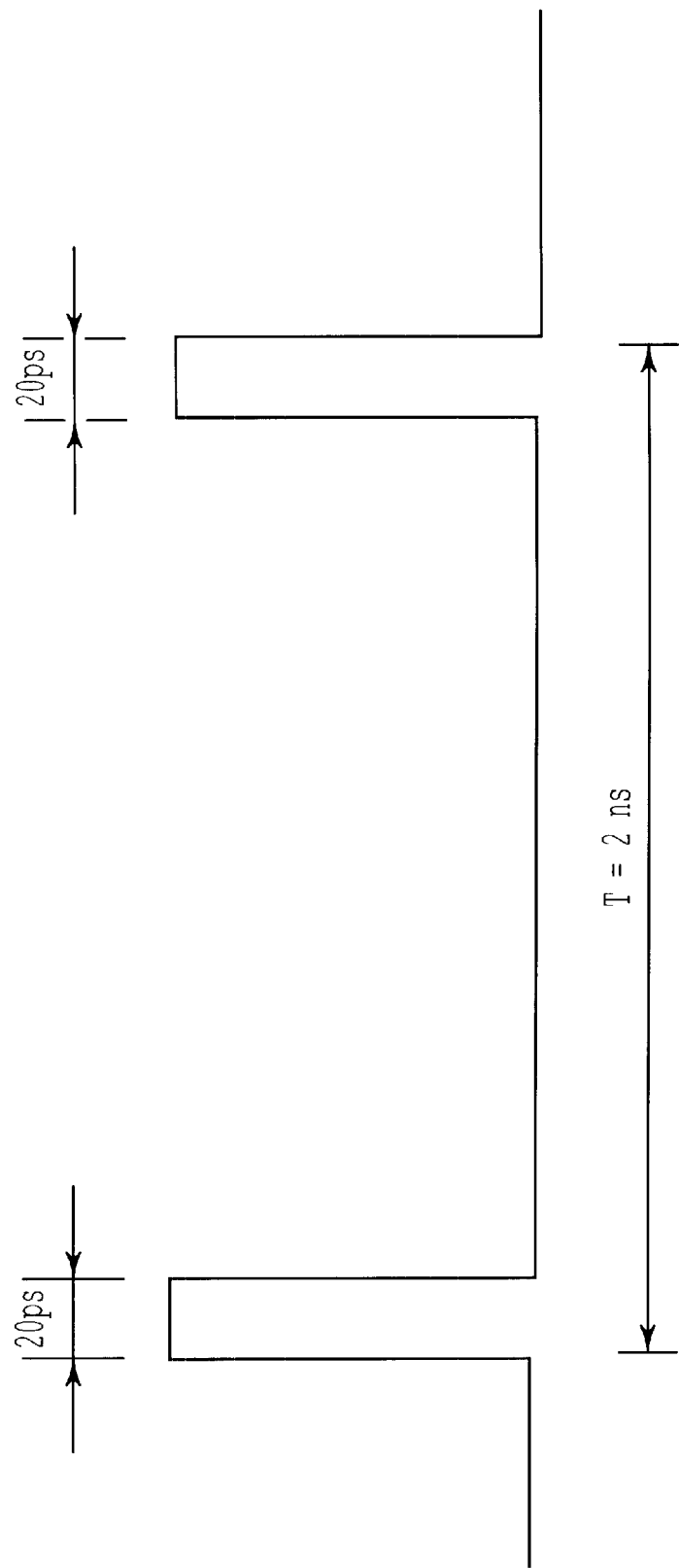
FIG. 3, an illustrative synchronization signal used by a device according to the invention.

FIG. 2 depicts a possible embodiment of a device according to the invention, employing by way of example optical transmission means. It comprises at least means for generating a synchronization signal and, at the level of each receiver 2, a synchronization loop 20 and means 31 for delaying the synchronization signal received, these delay means being controllable. The synchronization loop receives, at input, the signal sent by the centralized transmitter via the delay means 31. In the case of an optical application, the transmitter transmits for example on an optical carrier a string of pulses of 20 picoseconds spaced 2 nanoseconds apart. This signal results from the superposition of harmonic lines. FIG. 3 illustrates this waveform. Any other waveform is possible, for example pulses with frequency ramps or pseudo-random strings of pulses, with pulse compression at the level of the receiver. Obviously, values other than 20 picoseconds and 2 nanoseconds may be chosen, in particular the width of the pulses may vary from one to a few tens of picoseconds. For a wave travelling at the speed of light c, a recurrence period T of 2 nanoseconds in fact corresponds to a distance resolution equal to cT, of the order of 60 centimetres in air. For the synchronization system to operate, it is then necessary to ascertain roughly the length of the journey between the transmitter and a receiver to within less than 60 centimetres as the sequel will show, this not being constraining in practice.

The means for generating a synchronization signal comprise, for example a synthesizer 22, a generator of harmonics 23 and an optical source 24. The synthesizer drives the harmonics generator 23 so as to obtain for example a 20 GHz band modulation. This broad band then makes it possible to modulate an optical wave produced by the optical source 24, so as to create for example a string of 20-ps pulses spaced 2 ns apart, the reference of the synthesizer then being equal to 500 MHz.

The modulated signal provided by the optical source is for example distributed to the receivers 2 by means of a delay generation and switching system 21 such as described in French Patent Application No. 2,659,754. The transmission of a signal between this distribution system 21 and the receiver is for example ensured by an optical fibre 25, the length of which is known approximately. The centralized transmitter 1 comprises for example the synthesizer 22, the harmonic generator 23, the optical source 24 and the distribution system 21.

The optical carrier can for example convey information of a slower nature than the synchronization signals. This information is for example functional messages or fast clocks, for example at 100 MHz or 500 MHz. These fast clocks may in particular allow, via traditional counting, adjustment of the delay assigned to each receiver in steps of 10 ns and/or 2 ns, in particular in the case in which the synchronization of the signals is carried out in steps of 10 ns and/or 2 ns. For this purpose, coding means 26 and a clock 27 modulate if necessary the wave provided by the optical source 23, these means 26 and this clock 27 are for example contained in the centralized transmitter 1. The functional messages are for example values of delays to be applied by the delay means, in such a way as to synchronize all the signals output by them. The values of these delays have then been determined previously by each receiver with the aid of its synchronization loop. The receiver comprises means for decoding the message received, which are linked for example to delay control means 41 described hereafter.

Figure 4:
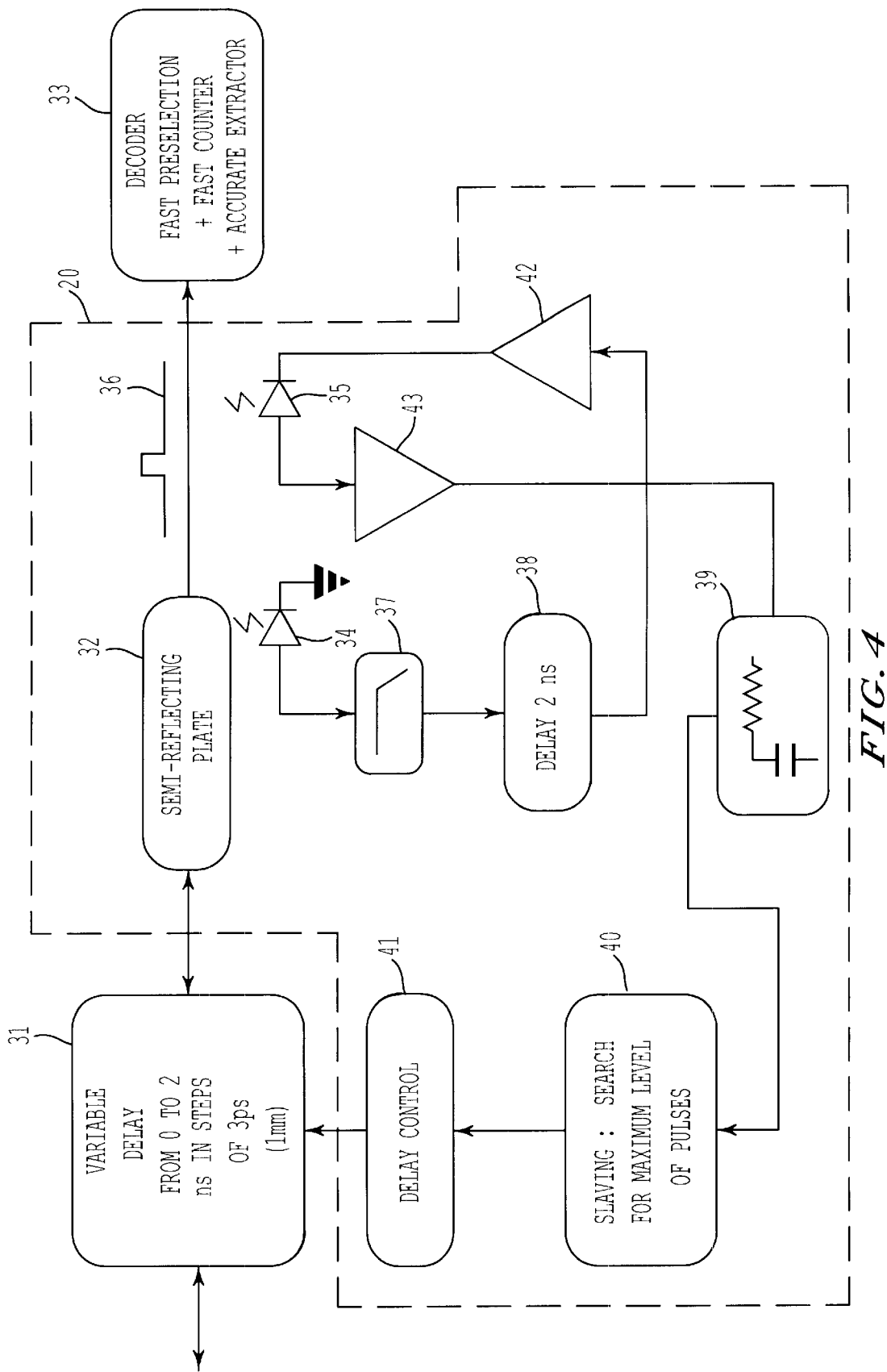
FIG. 4, elements of a device according to the invention which are situated at the level of a receiver, and especially a possible illustrative embodiment of a synchronization loop.

FIG. 4 depicts elements of the device according to the invention which are situated at the level of a receiver and in particular one possible embodiment of a synchronization loop 20. The synchronization loop comprises a semi-reflecting plate 32 downstream of the means 31 for delaying the signal received. The delay means 31 are for example optical delay means which can vary from 0 to 2 ns in steps of 3 picoseconds. For a wave travelling at the speed of light, these 3-picosecond steps make it possible to obtain a distance resolution of around a millimetre and a journey duration resolution of 3 picoseconds. These means 31 make it possible to obtain a varying delay either mechanically by shifting of mirrors, or electrically by selecting of optical pathways of different lengths, or alternatively by combining these two solutions. The delay means 31 carry out the correction ri defined in relation to the above relationship (1).

The semi-reflecting plate 32 is for example connected at the output of the delay means 31. This semi-reflecting plate 32 sends the synchronization signal back to the centralized transmitter whilst preserving a part thereof which is used to correlate the signal reflected by the transmitter so as to deduce therefrom the journey time associated with the distance between the transmitter and the receiver. In fact, for each receiver, the optical wave modulated with a modulation, for example of 20 GHz passband, makes the journey between the transmitter and the receiver a first time and then a part of this wave makes one or more outward/return trips from the receiver to the transmitter and from the transmitter to the receiver, and is added to the part of the wave which has made only the one-way journey between the transmitter and the receiver.

An optical decoder 33 counts the pulses of the fast clocks conveyed by the carrier wave transmitted by the transmitter so as to ascertain roughly the journey time if the latter is not known beforehand. The journey time may thus be ascertained to within a clock period. To be able to remove ambiguities regarding the journey lengths or times, the sequel will show that the period of the clock must be less than or equal to the recurrence period of the synchronization signal.

Correlation means allow detection of the journey time between the transmitter and the receiver to within a multiple of 2 nanoseconds and to within the delay ri introduced by the delay means 31. These correlation means give a maximum correlation value when the delay means 31 cause the wave having made a one-way journey to coincide temporally with those having made a triple, quintuple, etc journey. The maximum correlation value corresponds to the aforesaid detection. This is because, when the correlation is a maximum, this corresponds for example to the coinciding of the pulses of width equal to 20 picoseconds of the wave having made an outward trip and of one having made one or more outward/return trips, the coincidences revealing journey times modulo 2 nanoseconds, since these pulses have a recurrence period equal to 2 nanoseconds. A rough knowledge of the journey to within less than 60 centimetres, corresponding to a time of travel in air of 2 nanoseconds makes it possible to remove the ambiguity in the journey time or in the length of the journey between the transmitter and the receiver, to within the delay ri introduced by the delay means 31. To determine the exact journey time, it is then subsequently sufficient to deduct this correction ri from the multiple of 2 ns journey time. Means associated with the transmitter collect for example the value of the delay ri effected by the delay means 31 so as to deduce therefrom the exact travel time. The exactness is dependent in particular on the definition of the delay means 31. In the case in which they operate in steps of 3 ps, the journey time is determined to within 3 ps, or alternatively the distance is determined to within a millimetre. Knowing this information for each receiver obviously makes it possible to effect synchronization of the information picked up by these various receivers. The means for collecting the value of the delay ri are known to the person skilled in the art. This value is for example collected by way of the carrier wave reflected towards the receiver, after having been digitized and then serialized, the reflected carrier wave conveying the serial message to the centralized transmitter. The serial information, so as not to disturb the synchronization, is for example transmitted at a clock frequency very appreciably greater than the recurrence frequency of the synchronization signal. This clock frequency may for example be a few milliseconds. A specific serial link, by optical or electromagnetic transmission, can moreover be for example be provided between the transmitter and each receiver. The transmitter can then address itself to each receiver so as to ascertain on the one hand the value of the journey time to within 2 ns, as provided by the decoder 33, then on the other hand the exact value of the journey by taking into account the value ri established by the delay means 31. The digitizing and serializing means provided at the level of each receiver are not represented since they are well known to the person skilled in the art. These means which are means for accurately extracting the journey or the journey time are for example installed in the same digital circuit as that which comprises the optical decoder 33. Each receiver comprises for example at least means for storing the delay ri, this making it possible to ascertain the exact journey time once the synchronization operations have been carried out.

The correlation means comprise for example two detection paths, the correlation being performed between these two paths. The first path comprises for example a photodiode 34 which detects the signal 36 having passed through the semi-reflecting plate 32. Likewise, the second path comprises for example a photodiode 35 which detects this signal 36. A filter 37 is for example connected to the first path, at the output of the photodiode 34. The passband of this filter is for example a few gigahertz, so that a pulse of around 20 ps which drives this filter engenders an output signal of the order of 100 ps, this making it possible in particular to facilitate the correlation with the next pulse whose processing is described below. The first path further comprises, for example at the output of the filter 37, means 38 for creating a delay of 2 ns in the detection signal provided by the photodiode. These latter means may be controlled so as to create a delay which differs from 2 ns. This delay enables a pulse or a recurrence of order N−1 to be made to coincide substantially with the next pulse or recurrence of order N, when the duration of the journey from the transmitter to the receiver is a multiple of 2 ns, with the correction ri carried out by the delay means. This coincidence is then established on the second path, for example at the output of the second photodiode 35, which detects the signal of order N, and which receives that of order N−1, detected by the first path whose output is linked for example to the input of the second path. The output of this second path drives for example a filter 39 which transforms the pulse-like signals into a DC voltage, this filter delivering a maximum voltage when two pulses or more generally two successive signals coincide. The output of this filter 39 is linked to the input of slaving means 40, the slaving being performed in such a way as to obtain the maximum voltage at the output of the filter. For this purpose, the slaving means 40 deliver a control signal to means 41 for controlling the delay means 31. These latter then modify the delay ri until the maximum voltage is obtained at the level of the slaving means 40, that is to say in fact until the duration of the journey from the transmitter to the output of the delay means 31 is a multiple of 2 ns. To improve the utilization of the signals detected, the detection paths each comprise for example at their outputs, an amplifier 42, 43.

The synchronization of the signals from the transmitter to the receivers can then be performed in several ways. In a first possible mode of synchronization, the transmitter collects the value of the delay ri resulting from the slaving performed at the level of each receiver. Knowing the journey in air to within less than 60 centimetres, that is to say the journey time to within 2 ns, it deduces the exact journey therefrom, to within a few picoseconds, by deducting the delays ri from the multiple of 2 ns journey time immediately greater than the estimated journey time, doing so for each receiver. Knowing the journey time or the exact journey between the transmitter and each receiver, it is then easy to carry out the synchronization of the signals distributed to them. In a second possible mode of synchronization, the journey still being known roughly or the journey time being known to within 2 ns, the transmitter does not collect the value of the delays ri effected at the level of each receiver, but considering that the journey time at the output of the delay means is a multiples of 2 ns, and hence equal to the estimated value, it transmits the signals to the receivers taking into account solely the journey times which are multiples of 2 ns. The influence of the environment on the measurement of the journey time or on the synchronization does not arise since the measurement or the fine synchronization is carried out at the level of each receiver.

In the case in which signals to the receivers must be sent at different instants, whilst however preserving relative synchronism, an initial delay Ri on transmission can be created for each receiver. This delay is for example created on the basis of the clock 27 of the transmitter which for this purpose controls the system for generating and switching delays 21.

The energy communicated to each receiver for the calibration phase is very low. This is because, even furnished with optical amplification, the power of the signal received may be of the order of 50 mW and since the duration of a pulse is around 20 ps, the energy transmitted is therefore only a few picojoules.

This energy is sufficient to perform electrical control of functions demanding only a low level of energy. On the other hand, this energy might not be suitable for the direct driving of powerful functions if this proves necessary. To alleviate this drawback, considering that the maximum transmissible power is systematically limited by the optical amplifiers contained in the distribution system 21, the device according to the invention can furthermore comprise means which considerably increase the duration of the control signal before amplification, then means which temporally compress this control after optical amplification. By way of example, the duration of the control signal could be spread over 20 ns, instead of 20 ps, thus allowing a transfer of a few nanojoules. This energy applied to a photoconductor for example then allows the control of a voltage of the order 30 volts. The various harmonics of the optical signals are sent by the centralized transmitter to the receivers with a delay of 2 ns. The transmitter therefore successively transmits the various harmonics allowing by summation the creation of a pulse of duration 20 ps. Each harmonic is transmitted for one to several times the duration of 2 ns. Each receiver is equipped with a delay line so that the various harmonics re-circulate in the receiver, this making it possible temporally to superimpose the set of trains of harmonics in the receiver so as to recreate by summation the fine pulse, for example of 20 ps. Thus, the signal transmitted is spread temporally at the level of the centralized transmitter, amplified optically over the duration of spreading, then compressed temporally with the aid for example of a re-circulating delay line with which each receiver is equipped. The delay line is for example situated at the input of the receiver.

The illustrative embodiment of a device according to the invention such as described in relation to FIGS. 2 and 4 uses optical transmissions between the transmitter and the receivers, as well as optical means. It is, however, possible to make a device according to the invention in which the aforesaid transmissions are electromagnetic, as are the means of implementation. Additionally, to facilitate the understanding of the invention, the recurrence frequency of the synchronization signal has remained fixed at 2 ns. In fact other values may be used. These 2 ns correspond in fact to a minimum resolution of the journey time, or of the journey after conversion into the distance domain, with which the device must a priori comply. The synchronization loop makes it possible subsequently to refine the resolution, for example down to within a few picoseconds. Finally, the synchronization signal has been chosen to be pulse-like, with pulses of the order of 20 ps. Here again, other pulse widths may be chosen, and just as was mentioned previously, other types of signals may be used. It is sufficient for the successive signals to be able to be easily correlated with one another, especially by a synchronization loop as described in relation to FIG. 4. It should further be noted that the transmitter 1 is not necessarily a single transmitter but may correspond to a set of transmitters of signals.

What is claimed is:

1. Device for synchronizing signals transmitted from a transmitter to receivers, characterized in that it comprises at least, at the level of the transmitter, means for generating a synchronization signal having a recurrence period and, at the level of each receiver, controllable means for delaying the synchronization signal and a synchronization loop comprising, downstream of the delay means, a semi-reflecting plate such that a part of the signal makes at least one outward/return trip from the reciever to the transmitter and from the transmitter to the reciever, and comprising correlation means and means for slaving the delay means dependent on the correlation, a signal received by a receiver being synchronized when the correlation function of two successive recurrences of the synchronization signal passing through the semi-reflecting plate is a maximum.

2. Device according to claim 1, characterized in that the recurrence period is greater than or substantially equal to the minimum resolution of the journey time between the transmitter and a receiver.

3. Device according to claim 1, characterized in that the correlation means comprise two detection paths, a first path detecting a signal having passed through the semi-reflecting plate and comprising means for creating a delay substantially equal to the recurrence period in the detection signal, and a second path detecting a signal having passed through the semi-reflecting plate, the correlation being performed between the delayed detection signal of the first path and the detection signal of the second path.

4. Device according to claim 3, characterized in that the signals are detected by photodiodes.

5. Device according to claim 3, characterized in that the first path comprises a filter for broadening the detection signal.

6. Device according to claim 3, characterized in that the detection paths comprise, at output, amplifiers.

7. Device according to claim 1, characterized in that the correlation means comprise, at output, a filter which produces a DC voltage representing the correlation function.

8. Device according to claim 1, characterized in that the means for generating a synchronization signal comprise a synthesizer, a generator of harmonics and a source, the synthesizer driving the generator of harmonics so as to modulate an optical wave produced by the source.

9. Device according to claim 8, characterized in that the source is an optical source.

10. Device according to claim 1, characterized in that the recurrence period is of the order of a few nanoseconds.

11. Device according to claim 1, characterized in that the transmitter comprises a clock which modulates the signal provided by the source, a receiver comprising means for counting the clock pulses so as to estimate the duration of the journey between the transmitter and the receiver to within the clock period, the clock period being less than or equal to the recurrence period of the synchronization signal.

12. Device according to claim 1, characterized in that a receiver comprises extraction means determining the substantially exact duration of the journey from the transmitter to the receiver on the basis of the duration estimated to at least the recurrence period of the synchronization signal, and of the delay established by the delay means so as to obtain the maximum of the correlation function.

13. Device according to claim 12, characterized in that the receiver comprises means for sending the duration of the journey or the value of the delay to the transmitter.

14. Device according to claim 1, characterized in that it comprises at least means for storing the delay established by the delay means.

15. Device according to claim 1, characterized in that the transmitter comprises means for coding the wave provided by the source so as to send functional messages to the receivers.

16. Device according to claim 15, characterized in that a functional message to a receiver indicates to the latter the delay to be applied by the delay means, the receiver comprising means for decoding the message received, which are linked to means for controlling the delay.

17. Device according to claim 1, characterized in that the delay means can be controlled in steps of a few picoseconds.

18. Device according to claim 1, characterized in that the transmitter transmits in succession the various harmonics allowing by summation the creation of the synchronization signal, each harmonic being transmitted during one to several times the recurrence period, each receiver being equipped with a delay line so that the various harmonics re-circulate through the receiver, so as temporally to superimpose the set of trains of harmonics in the receiver so as to recreate by summation the synchronization signal.

19. Device according to claim 18, characterized in that the delay line is situated at the input of the receiver.

20. Device according to claim 1, characterized in that the synchronization signal is pulse-like.

21. Device according to claim 20, characterized in that the width of the pulse is of the order of one to a few tens of picoseconds.

* * * * *